Aug. 15, 1967     M. BOYER     3,335,557
READILY CLEANABLE HAND RAKE AND SELF-CLEANING TRAILER RAKE
Filed Oct. 16, 1964
3 Sheets-Sheet 1
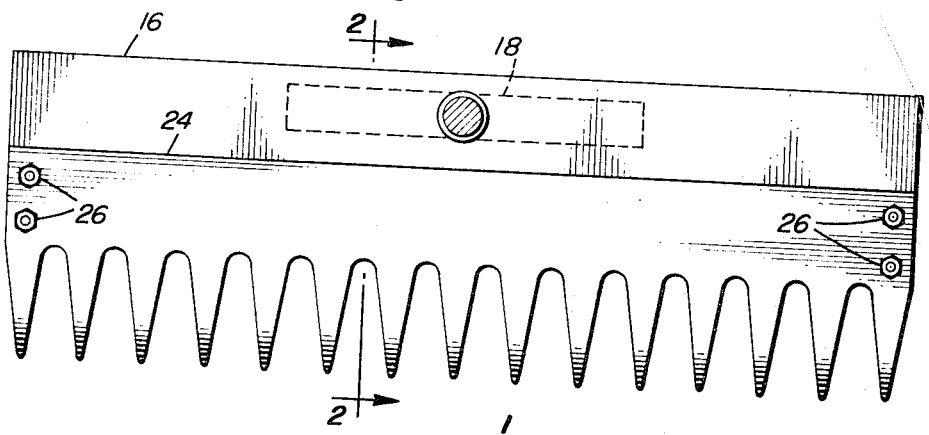
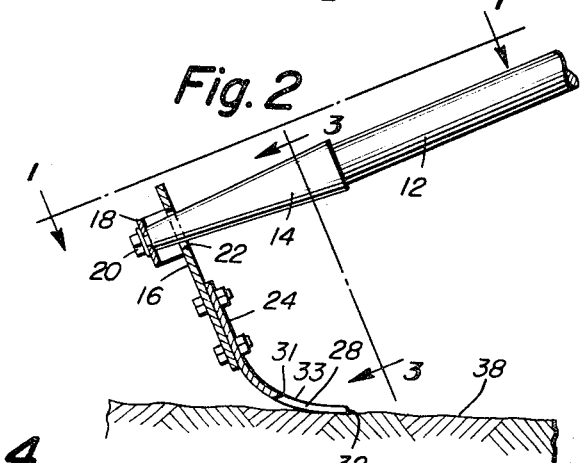
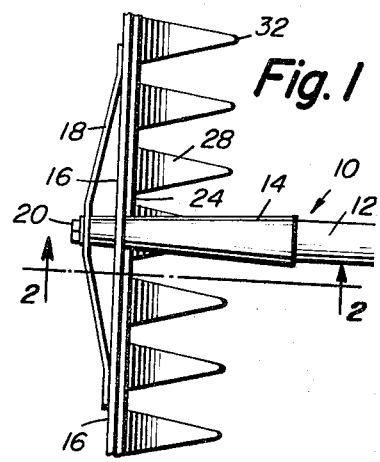
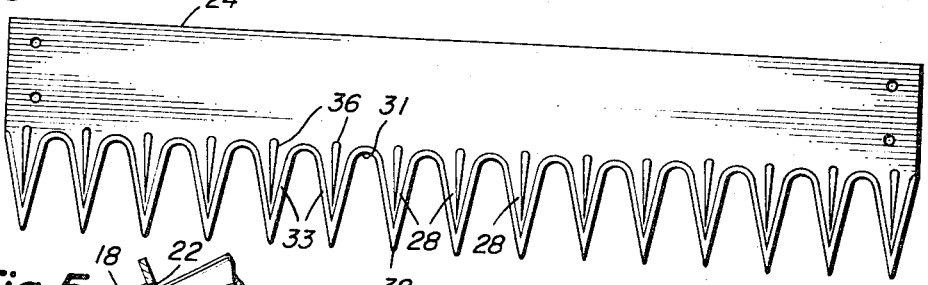
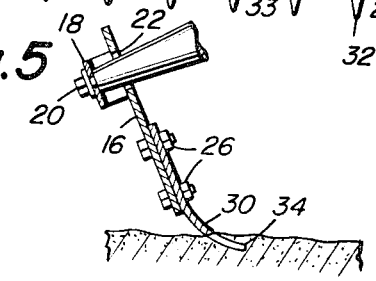
INVENTOR
Martin Boyer
BY *Gustave Miller*
ATTORNEY

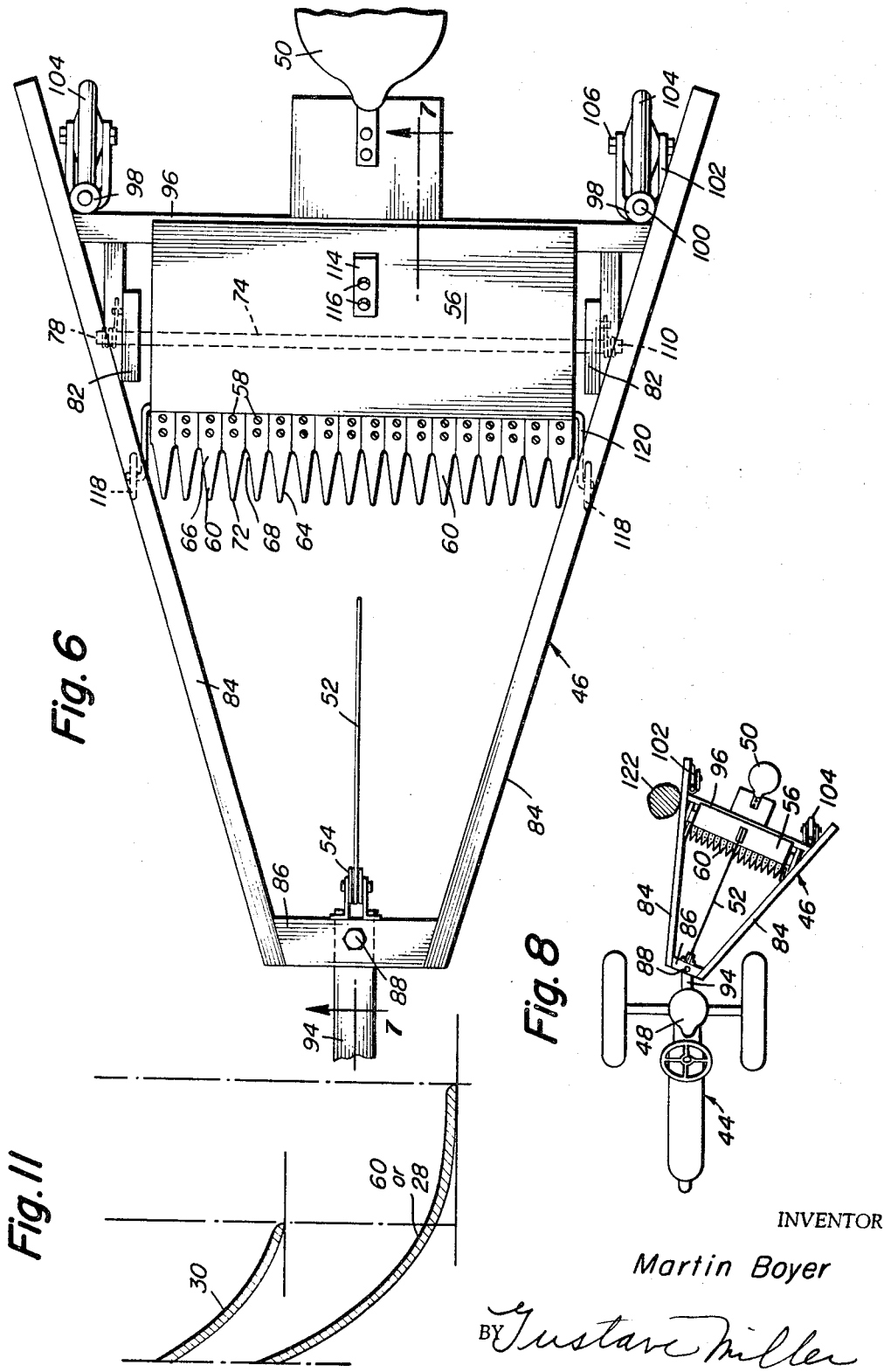

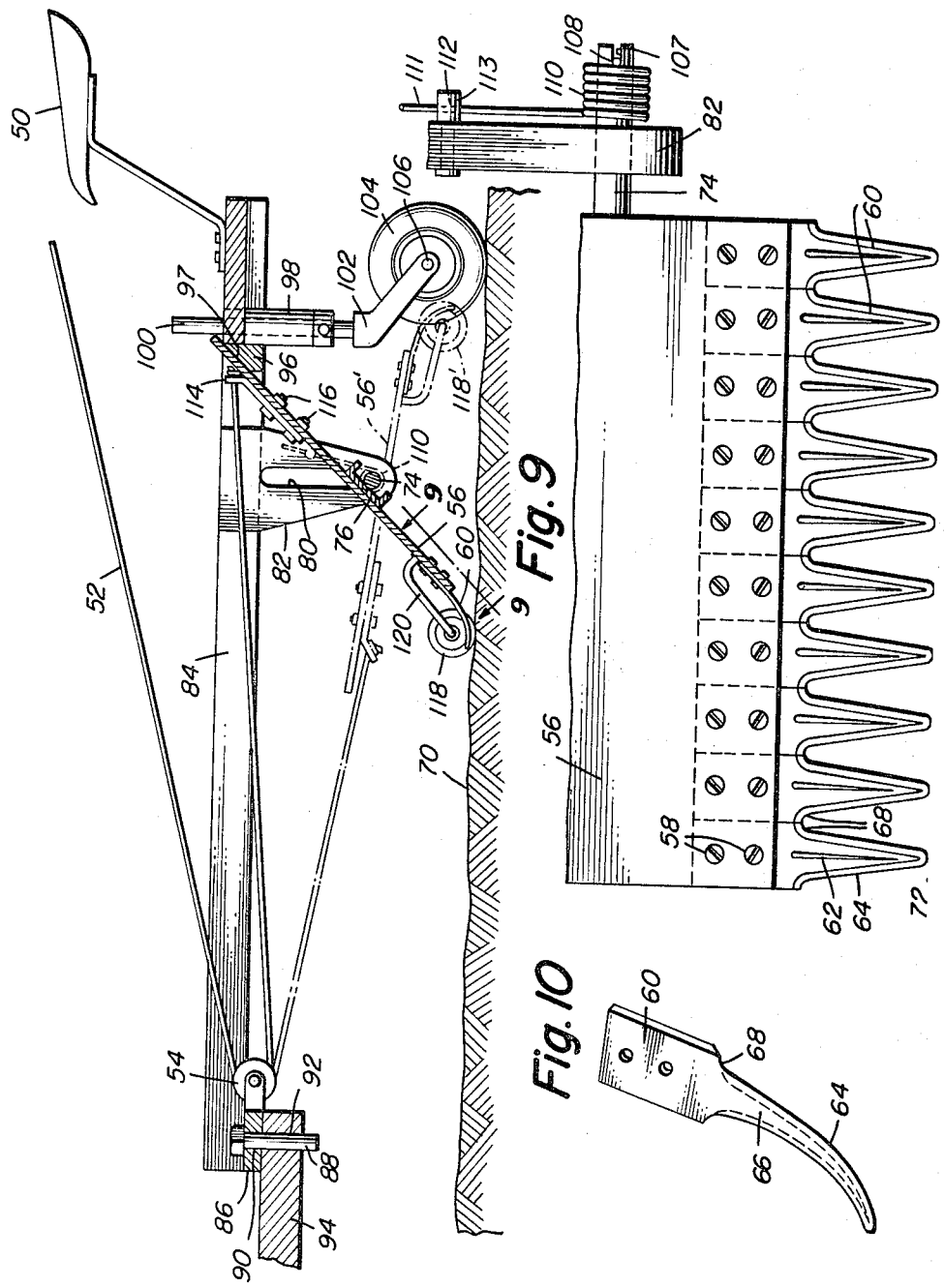

United States Patent Office 3,335,557
Patented Aug. 15, 1967

3,335,557
READILY CLEANABLE HAND RAKE AND
SELF-CLEANING TRAILER RAKE
Martin Boyer, P.O. Box 24, Lowry, Minn. 56349
Filed Oct. 16, 1964, Ser. No. 404,437
6 Claims. (Cl. 56—393)

This invention relates to a hand rake and to a tractor-trailer rake, and has for an object to provide a rake that is readily cleanable in either form.

A further object of this invention is to provide a readily cleanable hand lawn rake having fully underslung teeth that will float on the curved backs of the teeth on the ground or lawn being raked, rather than be supported on the ground on the points of the teeth, as is customary with conventional rakes.

A further object of this invention is to provide a readily cleanable rake wherein the individual teeth will have their side edges contact each other adjacent the rake, and wherein the side edges are sharpened, at least adjacent their contacting areas, so as to cut off dead and matted grass or the like which is being raked.

A further object of this invention is to provide, at least, a readily cleanable hand lawn or garden rake having no movable parts.

A further object of this invention is to provide a readily cleanable hand garden rake having partly underslung teeth to pulverize the ground in raking loose dirt in a garden.

A further object of this invention is to provide a readily cleanable rake that has underslung, curved teeth that are sharpened on their side edges, particularly adjacent their rake head ends so that, in the fully underslung form, the lawn rake or trailer rake will have the teeth float on their curved backs and the sharpened side edges will cut dead or matted grass, and in the half underslung form, the hand garden rake teeth will sink into loose garden dirt and the sharpened edges will pulverize the dirt while the debris is being raked up.

A further object of this invention is to provide a readily cleanable lawn or garden hand rake, which, in spite of being readily cleanable, may be turned over on its back and serve in pushing accumulated debris along the ground.

A further object of this invention is to provide a self cleaning park lawn trailer rake, which is to be pulled by a tractor, wherein the rake teeth and rake head are immovable, relative to each other, and may be readily moved from a raking position to a self-cleaning position by an operator riding the tractor or the trailer, and then returned to raking position, without the operator having to dismount from the tractor or trailer.

A further object of this invention is to provide a tractor trailer rake which may automatically move to one side when skirting a tree trunk or obstruction, and then return to straight line trailing position, thus permitting the rake to operate very closely adjacent the tree trunk or obstruction, without danger of damage thereto.

With the above and related objects in view, this invention consists in the details of construction and combination of parts, as will be more fully understood from the following description, when read in conjunction with the accompanying drawing, in which:

FIG. 1 is a fragmentary top plan view of a hand rake of this invention, on line 1—1 of FIG. 2.

FIG. 2 is a sectional view through one form of lawn hand rake, on line 2—2 of FIGS. 1 and 3, showing fully underslung teeth of a lawn rake.

FIG. 3 is a top sectional view on line 3—3 of FIG. 2.

FIG. 4 is a bottom plan view of the integral form of rake teeth.

FIG. 5 is a sectional view through a form of hand garden rake, similar to FIG. 2, but showing half underslung teeth of the garden rake.

FIG. 6 is a top plan view of a trailer rake form of this invention.

FIG. 7 is a view on line 7—7 of FIG. 6.

FIG. 8 is a top plan view, on a smaller scale, of a tractor towing the trailer rake moving past an obstruction.

FIG. 9 is a view on line 9—9 of FIG. 7.

FIG. 10 is a perspective view of a detachable rake tooth.

FIG. 11 is a comparative showing of a half underslung and a fully underslung tooth.

There is shown at 10 one form of the self cleaning hand rake of this invention. This hand rake 10 includes a conventional handle 12 extending into a handle socket 14 to which is secured the rake head 16 in any suitable manner. If the rake head 16 is of thin sheet metal, as here shown, it may be provided with a brace strip 18 through which a stud screw 20 is threaded into the end of the wooden rod handle 12 as shown, the rake head 16 having an opening 22 through which the socket 14 extends to the brace strip 18, the ends of the brace strip 18 being secured as by spot welding or the like to the rake head 16.

A rake tooth bar 24 is detachably secured by bolts and nuts 26 in partly overlapping position adjacent the bottom edge of the rake head 16. Integrally extending from the bottom edge of the tooth bar 24 are a plurality of individual teeth 28 or 30, the teeth 28 being rearwardly curved and fully underslung to a position, with the rake handle 12 held at the normal raking angle, that the teeth 28 will float on their curved backs and the sharpened and the curved side edges 31 and 33 will cut dead or matted grass, thus providing a lawn rake as shown in FIG. 2, while the teeth 30 are rearwardly curved and half underslung to a position with the rake handle held at the normal raking angle, that the teeth 30 will sink into loose garden dirt and the sharpened edges 33 will pulverize the dirt while the debris is being raked up, thus providing a garden rake as in FIG. 5.

Both the fully underslung teeth 28 and the partly underslung teeth 30 are sharpened at least along the curved edges 31 where the side edges of the individual teeth 28 or 30 merge in a smooth curve into contact with the side edges of the adjacent teeth providing a non-wedging area between the teeth, and as shown these sharp edges 33 may extend down as far as the free ends 32 or 34 of the teeth. Furthermore, the teeth 28 and 30 are sharp on their upper surfaces by being bevel-ground on the sides toward their bottom surfaces as shown. The tooth bar 24 and its integral teeth is made of any suitable metal such as iron, steel, tempered aluminum, or the like, of a suitable gauge. If the gauge of the metal is rather thin, then each tooth may be provided with an integrally formed reinforcing rib 36, thus enabling a light gauge metal to be used, and thus reducing the weight of the hand rake, facilitating its use.

Although the teeth 28 and 30 are both shown as somewhat triangular in outline, they may be of any suitable outline and may taper only adjacent their points 32 or 34. Obviously, the tooth bars 24 with either the fully underslung teeth 28 or the half underslung teeth 30 are interchangeable with each other, thus making one rake handle 12 and rake head 16 usable for both purposes, although for convenience, complete separate lawn and garden rakes may be provided.

In operation, the lawn rake with the fully underslung teeth 28 is used for raking a lawn, and the free ends 32 of the fully underslung teeth 28 float above the lawn surface 38 as shown in FIG. 2, as the rake teeth 28 ride on their curved bottom surfaces on the lawn surface 38. The sharp edges 31 and also 33, if present, of the rake teeth 28 serve to cut any dead or matted grass and thus rake it up, as the hand rake 10 is drawn toward the operator. However, as the hand rake 10 is moved away from the operator holding the handle, the hand rake 10 is self cleaning, for the debris will fall away from the rake teeth 30 and rake head 16, due to the curved, underslung shape of the teeth 30, and be left on the lawn surface 38 in suitable windrows, as desired. By turning the rake 10 upside down, the windrows or other debris may be easily pushed in the same manner as with any conventional rake.

In the garden rake shown in FIG. 5, the half underslung teeth 30 have their teeth ends 34 penetrate the garden dirt surface 40 to thus pulverize the dirt of the garden in an understandably desirable manner, yet still raking up and collecting any debris that may be present, and it is likewise self cleaning when pushed away from the operator to deposit the debris in windrows for later collection.

In the tractor trailer form 42 of this invention shown in FIGS. 6 to 10 inclusive, any conventional lawn or park tractor 44 may be used for towing the trailer rake 46. As shown in FIG. 8, a tractor operator may occupy the tractor seat 48 and a trailer rake operator may occupy the trailer rake seat 50. However, in view of the fact that the only control used on the trailer rake 46 is the rake control cable 52, it is obvious that the control cable 52, instead of passing through the cable pulley 54, may instead be tied at its end to a convenient location on the tractor 44 for operation by the tractor operator, or, instead, conventional extensions of the tractor controls may be extended to the trailer 46 for operation by the trailer operator.

On the trailer rake 46 there is provided a rake head 56 to which is attachably secured, as by stud bolts 58, a plurality of adjacent, substantially contacting separate individual rake teeth 60 that are fully underslung, the same as the fully underslung teeth 28 of the lawn hand rake. If desired, the same rake teeth bar 24 and integral teeth 28 could be used as in the hand lawn rake, if made of suitable gauge metal, but in view of the fact that the tractor trailer rake 42 may get much heavier use, separately replaceable teeth 60 are more desirable. The separate teeth 60 are shaped similar to the teeth 28, but of heavier gauge, and reinforcing rib 62 may also be provided. The teeth 60 are sharpened along their side edges 64 of their top surfaces 66, and particularly at the rear curves 68 of the side edges 64 so that the rear sharp curves 68 of each two adjacent teeth 60 form a somewhat semi-circular curve 68 the same as the curved sharp edges 31 of the teeth 28. Thus the fully underslung teeth 60, with their rear sharp curve 68, are set to float on or just above the lawn surface 70, with the teeth free ends 72 slightly above the lawn surface 70, the action of the fully underslung trailer rake teeth 60 being similar in operation to that of the fully underslung lawn rake teeth 28.

However, as it is usually impractical to back up the tractor trailer rake 42 to permit the teeth 60 to clean themselves, the rake head 56 is mounted for controllable movement by being secured on a transverse pivot bar 74, an intermediate reinforcing transverse channel bar 76 being provided, if desired, therebetween. The opposite ends 78 of the rake head pivot bar 74 extend through vertical slots 80 of two stanchions 82 secured on and depending downwardly from two forwardly converging trailer side frame bars 84. The side frame bars 84 are secured at their forward ends to a short cross frame bar 86, and a tractor hitch pivot 88 is removably inserted down through a hitch aperture 90 therein and a suitable similar hitch aperture 92 in a hitch bar 94 on the rear of the tractor 44.

A trailer rear frame bar 96 is secured to the side frame bars 84 adjacent their rear ends, and mounted on each end of the rear cross frame bar 96 beveled at 97 is a castor sleeve 98 in which is pivoted the castor shaft 100 of a castor fork 102 in which is journaled a castor wheel 104 on a castor axle 106.

The ends 78 of rake head transverse pivot bar 74 are slotted at 107 to receive the diametrically extending ends 108 of coil spring 110 whose other ends 111 are biased through holes 112 in anchor pins 113 secured to the stanchions 82 to rotate the rake head pivot bar 74 in a direction to extend the rake teeth 60 to a forwardly extending raking direction, as well as downwardly toward the bottom of the slots 80 as shown in FIG. 7 when the cable 52, tied to the arm 114, secured by studs 116 to the top end of rake head 56, is pulled. Rake head carrying wheels 118 are journaled on Z-shaped axles 120 secured at each lower end of rake head 56 as shown, the wheels 118 supporting the rake head 56 so that the free ends 72 of the rake teeth do not touch the surface 70 of the lawn, but float just thereabove, and likewise do not touch the surface 70 when the rake head 56 is moved between the forward raking position shown at 56 in full lines, and the rear self cleaning position shown at 56' in dot-dash outline, the wheels being shown at 118'.

In operation, either one or two operators may be used, as above described. Normally, the springs 110 bias the rake head 56 and rake teeth 60 to the forwardly extending raking position shown in full lines, so that the teeth 60 will rake up all debris, the sharp side edges 64 and sharp rear curved edges 68 cutting any dead or matted grass so that it will be raked up. At suitable intervals, the operator in control will pull the cable 52 to move the rake head 56 and teeth 60 to the rearwardly extending self cleaning position at 56', the cable being pulled enough to hold the rake teeth sufficiently above the surface 70 so as to drop and pass over the collected debris, whereupon, on releasing the cable, the coil springs 110 will again bias the rake head 56 to the forwardly extending raking position. Should there be a tree trunk 122 or other obstruction on the lawn surface 70, the rake can operate very close thereto, for the side frame bar 84 touching the tree trunk 122 will merely cause the trailer rake 46 to move somewhat sideways on its castor wheels 104, and then pivot back on its hitch pivot 88 to again follow behind the tractor 44.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A readily cleanable rake comprising a rake head, rake supporting means extending from said rake head for supporting said rake head at a desired angle, and underslung curved teeth extending from said rake head, the side edges of each tooth merging in a smooth curve into contact with the side edges of the adjacent teeth providing a non-wedging area between the teeth, said curved side edges being bevel ground on one of their top and bottom surfaces to provide sharp edges on the other of their top and bottom surfaces, said rake head supporting means comprising a manual rake handle, said rake head having an aperture centrally intermediate its opposite edges, a brace strip secured to said rake head on opposite sides of said apertured handle socket extending through said central aperture to said brace strip, and a set screw secured through said brace strip to the end of said rake handle extending into said socket.

2. A self-cleaning rake comprising a rake head, rake supporting means extending from said rake head for supporting said rake head at a desired angle, and underslung curved teeth extending from said rake head, the side edges of each tooth merging in a smooth curve into contact with the side edges of the adjacent teeth providing a non-wedging area between the teeth, said curved side edges being bevel ground on one of their top and bottom surfaces to provide sharp edges on the other of their top and bottom surfaces, said rake head supporting means comprising a towable trailer, and means pivotally mounting said rake head on said trailer for controllable movement between a forwardly extending raking position and a rearwardly extending rake cleaning position.

3. The rake of claim 2, said trailer comprising a pair of forwardly converging side bars, a vertically extending hitch pivot secured to the converged forward ends of said side bars, and a caster wheel mounted at the rear end of each side bar, whereby said trailer may move sideways when either side bar collides with an obstruction when being towed.

4. The rake of claim 2, said pivotal mounting means for said rake head comprising a transverse pivot rod on which said rake head is secured, a slotted stanchion secured to and depending from each opposite side of said trailer adjacent its rear end, the opposite ends of said transverse pivot rod extending through said slotted stanchions, manually operable means secured to said rake head extending upwardly and rearwardly of said pivot rod for pivoting said rake to a rearwardly extending self cleaning debris discharging position, and coil spring means biasing said rake to a forwardly extending raking position.

5. The rake of claim 4, said manually operable means comprising a cable and rake teeth supporting wheels secured to said rake head supporting said teeth slightly spaced above a surface being raked.

6. The rake of claim 5, an operator riding seat mounted on said trailer at the rear thereof, and a cable pulley mounted on said trailer at the forward end thereof, said cable extending from said rake head forward to said pulley and then rearward to operator accessible position.

References Cited
UNITED STATES PATENTS

| | | | |
|---|---|---|---|
| 895,847 | 8/1908 | Ditchfield | 56—400.04 |
| 1,074,589 | 9/1913 | Ferguson | 37—131 |
| 1,174,699 | 3/1916 | Dunlap | 172—264 |
| 1,849,408 | 3/1932 | Rugg | 56—400.21 |
| 2,065,830 | 12/1936 | Sherman | 56—400.07 |
| 2,651,859 | 9/1953 | Gralenski | 37—129 |
| 3,266,181 | 8/1966 | Olafson | 37—169 |

ABRAHAM G. STONE, *Primary Examiner.*

ANTONIO F. GUIDA, *Examiner.*